(12) United States Patent
Pelorson et al.

(10) Patent No.: US 12,579,749 B2
(45) Date of Patent: Mar. 17, 2026

(54) METHOD FOR PROCESSING DATA REPRESENTING A THREE-DIMENSIONAL VOLUMETRIC SCENE

(71) Applicant: 4D VIEW SOLUTIONS, Grenoble (FR)

(72) Inventors: Quentin Pelorson, Le Pin-Villages (FR); Valentin Bonhomme, Grenoble (FR); Odilon Vatonne, Grenoble (FR); Clément Menier, Grenoble (FR)

(73) Assignee: 4D VIEW SOLUTIONS, Grenoble (FR)

( * ) Notice: Subject to any disclaimer, the term of this patent is extended or adjusted under 35 U.S.C. 154(b) by 169 days.

(21) Appl. No.: 18/564,863

(22) PCT Filed: Jun. 16, 2022

(86) PCT No.: PCT/FR2022/051173
§ 371 (c)(1),
(2) Date: Nov. 28, 2023

(87) PCT Pub. No.: WO2022/263781
PCT Pub. Date: Dec. 22, 2022

(65) Prior Publication Data
US 2024/0290036 A1 Aug. 29, 2024

(30) Foreign Application Priority Data
Jun. 18, 2021 (FR) ...................................... 2106478

(51) Int. Cl.
*G06T 17/20* (2006.01)
*G06T 7/73* (2017.01)

(52) U.S. Cl.
CPC ................ *G06T 17/20* (2013.01); *G06T 7/75* (2017.01)

(58) Field of Classification Search
CPC .................................. G06T 17/20; G06T 7/75
See application file for complete search history.

(56) References Cited

U.S. PATENT DOCUMENTS 9,224,245 B2 12/2015 Farrer
2017/0032560 A1 2/2017 Dionne
(Continued)

FOREIGN PATENT DOCUMENTS

WO 2009105126 A1 8/2009

OTHER PUBLICATIONS

"Tracking Textured Deformable Objects Using a Finite-Element Mesh" by Sotiris Malassiotis and Michael G. Strintzis, IEEE transactions on circuits and Systems for video technology, vol. 8, No. 6, Oct. 1998.
(Continued)

*Primary Examiner* — Kent W Chang
(74) *Attorney, Agent, or Firm* — Falcon Rappaport & Berkman LLP

(57) ABSTRACT

A method for digitally processing data representing a three-dimensional volumetric scene, the method being implemented by a computer and comprising the steps of: accessing the data representing the scene; designating a first frame associated with a first mesh; designating a first position in the first mesh; determining a first facet of the first mesh on which the first position is located; accessing a list of pre-established associations between original positions of vertices of the first facet and respective associated positions that are expressed in a reference frame which is specific to a second mesh of a second frame and has a different topology from the first mesh, these associations representing the evolution of the scene over time; and determining, on the basis of the respective associated positions, a position
(Continued)

located in the second mesh that is associated with the position designated in the first mesh.

8 Claims, 5 Drawing Sheets

(56) References Cited

U.S. PATENT DOCUMENTS

2023/0156177 A1* 5/2023 Sato .......................... G06T 7/70
345/419
2025/0078388 A1* 3/2025 Odding .......... H04N 21/234345

OTHER PUBLICATIONS

"Hybrid Human Modeling: Making Volumetric Video Animatable" by Peter Eisert and Anna Hilsmann, Computer Vision-ECCV 2020: 16th European Conference, Glasgow, UK, Springer International Publishing.

"Stereo vision-based tracking of soft tissue motion with application to online ablation control laser microsurgery" by Andreas Schoob et al, Medical Image Analysis 40 (2017), pp. 80-95, Elsevier.

"High Resolution Passive Facial Performance Capture" by Derek Bradley et al., ACM Transactions on Graphics, vol. 29, No. 4, Article 41, 2010.

"High-quality streamable free-viewpoint video", ACM Trans. Graphics (SIGGRAPH), 34(4), 2015.

"A local/global approach to mesh parameterization" by Liu et al., Eurographics Symposium on Geometry Processing 2008, vol. 27 (2008), No. 5.

Fratarcangeli et al. "Facial Motion Cloning with Radial Basis Functions in MPEG-4 FBA"; Graphical Models, vol. 69, No. 2, pp. 106-118, Feb. 2, 2007.

International Search Report, Application No. PCT/FR2022/051173, mailed Nov. 15, 2022 (15 pages).

Search Report, Application No. FR 2106478, Mar. 28, 2022 (3 pages).

* cited by examiner

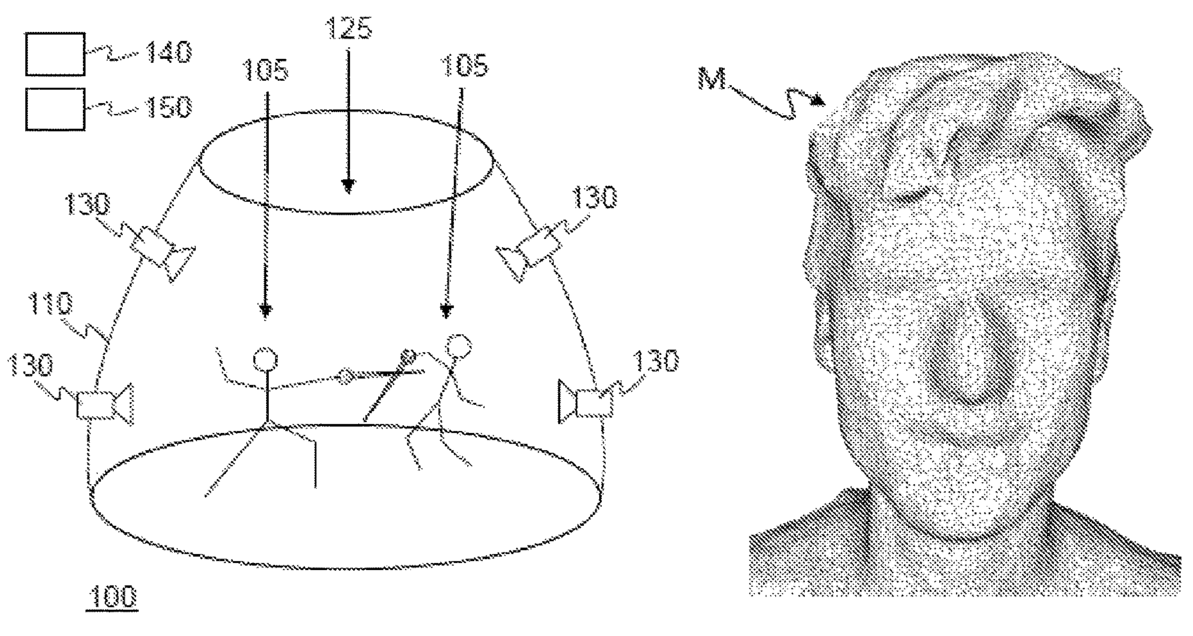
Figure 1A
Figure 1B
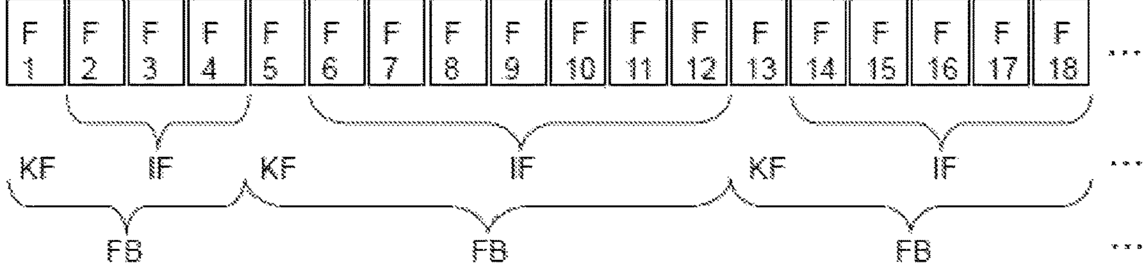
Figure 1C
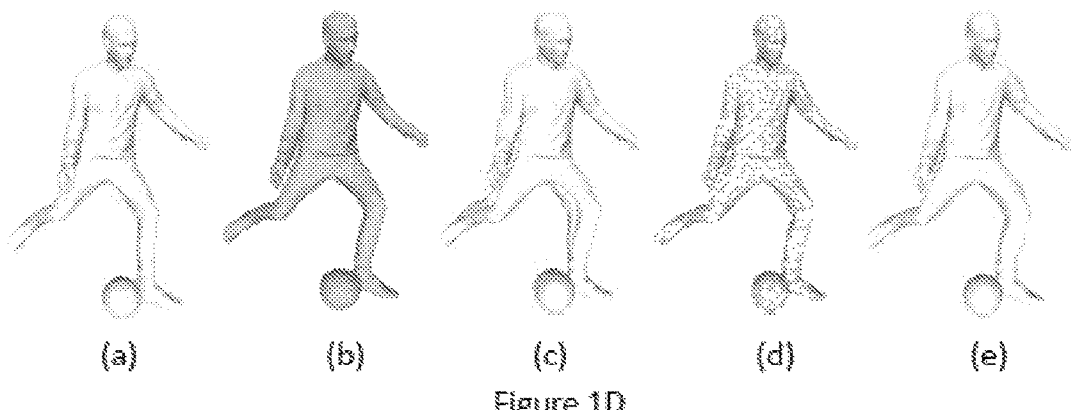
Figure 1D

METHOD FOR PROCESSING DATA REPRESENTING A THREE-DIMENSIONAL VOLUMETRIC SCENE

TECHNICAL FIELD

The invention relates to a method for processing data representing a three-dimensional volumetric scene, that is, comprising objects extending in the three directions of space.

PRIOR ART

The invention relates to a method for establishing a continuous link between successive frames of volumetric data, that is, representing three-dimensional volumetric scenes, and the application of this method to digital processing of successive frames of these volumetric data.

To the knowledge of the inventors, this subject has hitherto not been developed in the field of three-dimensional infographics, and no technically satisfactory solution has been known, in particular in the case of sequences with a large change of topology.

In the case of two-dimensional video sequences, or 2D video sequences, it is possible to apply effects, or filters, to the successive frames forming a video sequence by means of known calculations based on the pixels of the successive images of the frames.

This type of application is carried out for example by means of "optical flow" techniques, based on the identity of the pixels from one frame of a digital video sequence to the next, an identity making it possible to track the movement of objects in the successive frames and therefore to carry out the tracking thereof and, if desired, to automatically apply processing to each of these frames thanks to the tracking of the objects.

In the case of a three-dimensional volumetric video sequence, or 3D video sequence, the volumetric data do not correspond to pixels but define a mesh consisting of facets specific to each frame.

The methods applicable to 2D video sequences are therefore not applicable to 3D video sequences.

Thus, associating a sound source with the mouth of a figure moving in a three-dimensional scene requires a manual monitoring of the movement of the mouth, a tedious and time-consuming method involving a manual Identification of the position of the mouth for each frame of the scene defined by a topology different from the preceding one and resulting in a result that is not very satisfactory qualitatively speaking.

There are also approaches by face detection in each frame, which is unsatisfactory when several faces are present in the scene.

In addition, these approaches work only for faces and are unable to extend to more general cases.

The article "Tracking Textured Deformable Objects Using a Finite-Element Mesh" by Sotiris Malassiotis and Michael G. Strintzis, IEEE transactions on circuits and Systems for video technology, Vol. 8, No. 6, October 1998, relates to an algorithm for estimating the movement of an object subject to non-rigid deformations.

The article "Hybrid Human Modeling: Making Volumetric Video Animatable" by Peter Eisert and Anna Hilsmann, Computer Vision-ECCV 2020: 16th European Conference, Glasgow, UK, Springer International Publishing, relates to a method for creating hybrid video/animation representations of human bodies and faces.

The U.S. Pat. No. 9,224,245 B2 by Farrer et al. relates to an animation method combining a depth map and a two-dimensional image to form three-dimensional sequences.

The article "Stereo vision-based tracking of soft tissue motion with application to online ablation control laser microsurgery" by Andreas Schoob et al, Medical Image Analysis 40 (2017), pages 80-95, Elsevier, relates, in the field of laser micro-surgery by images, to a method of non-rigid tracking by stereo imaging and its application to surgical ablation by laser.

The article "High Resolution Passive Facial Performance Capture" by Derek Bradley et al., ACM Transactions on Graphics, Vol. 29, No. 4, Article 41, 2010, relates to a method for video capture of human facial expressions.

According to this article, in order to proceed with uniform tracking of the geometry and texture of the face during a video sequence, a single reference mesh is used and serves to generate a set of meshes of the same topology, that is to say with corresponding vertices and the same connectivity between these vertices.

In this way, it is possible to propagate from one mesh to another, from one frame to another for the entire sequence, modifications made to the geometry and texture of an initial frame by an artist.

However, this method is limited to a video sequence described by means of meshes having the same topology, and cannot be applied to a scene involving a change in the topology of the mesh, such as for example during the appearance in the scene of an object not visible in the reference mesh.

There is therefore an unsatisfied need for the digital processing of 3D video sequences, and more specifically the digital processing of the successive frames of such sequences involving a change in topology of the meshes.

DISCLOSURE OF THE INVENTION

The invention aims to provide a digital processing method of a three-dimensional volumetric scene implementing time tracking of the position of points.

More specifically, the invention relates to a method for digitally processing data representing a three-dimensional volumetric scene comprising a 3D video sequence with frames each associated with a respective mesh consisting of facets and representing volumetric data of the scene at a given instant, the method being implemented by computer and comprising the steps of accessing, in a data storage and processing system, said data representing a three-dimensional volumetric scene, of designating, in the sequence of frames, a first frame associated with a first mesh of said respective meshes, designating a first position in the first mesh, the method further comprising the steps of determining a first facet of the first mesh on which the first position is located, accessing, in the system, a list of pre-established associations between the original positions of the vertices of the first facet and respective associated positions expressed in a reference frame specific to a second mesh of a second frame of the sequence of frames, these associations representing the development of the scene over time, the first mesh and the second mesh having different topologies, and determining, from respective associated positions, a position located in the second mesh associated with the position designated in the first mesh.

The above method makes it possible to automate the tracking in space and time of a point of a three-dimensional volumetric scene modeled by a succession of frames with meshes associated respectively with each of the frames.

In addition, this tracking is generic, that is to say applicable to any type of visual content, including in the case of strong topological variations between the frames, less demanding in computing power, makes it possible to perform real time tracking and to apply digital processing to this succession of frames.

The method of processing a volumetric video stream according to the invention may have the following features:

- each of the respective associated positions can be defined by an affiliated facet of the second mesh on which it is located and barycentric coordinates associated with this affiliated facet,
- the first frame and the second frame may be two consecutive frames;
- the method may further comprise a step of associating a position of a sound source with the position located in the second mesh;
- the frames may belong to at least two blocks of frames having different topologies, the list comprises pre-established associations between positions of each vertex of each frame and positions in the neighboring frames, these associations representing the evolution in space of the elements of the scene over time, and when two considered frames belong to the same frame block, then the pre-established associations are defined by an identity operator; and
- the method may further comprise a preliminary step of generating the list of pre-established associations between the original positions of the vertices of the first facet and the respective associated positions expressed in the reference frame specific to the second mesh, which may comprise the steps of designating a current vertex of the first mesh; deforming the first mesh so as to approximate the second mesh; calculating, for a position of the first deformed mesh corresponding to the current vertex, an approximate position that is closest to a facet of the second mesh; identifying the facet on which the position of the second mesh is located; and calculating barycentric coordinates defining the approximate position in the reference frame specific to the second mesh.

The invention may extend to:

- a data processing system comprising means for performing the steps of the method;
- a computer program comprising instructions which, when the program is executed by a computer, implements the steps of the method; and
- a computer readable medium comprising instructions which, when executed by a computer, implement the steps of the method.

BRIEF DESCRIPTION OF THE DRAWINGS

The present invention will be better understood and other advantages will become apparent on reading the detailed description of the embodiment provided by way of non-limiting example and shown by the appended drawings, wherein:

FIG. 1A shows a videogrammetry studio;

FIG. 1B shows the modeling of a scene by a mesh;

FIG. 1C shows a succession of frames;

FIG. 1D shows an approximation of a mesh of a target frame by deformation of the mesh of a source frame;

FIG. 2A shows a succession of frames as well as bridges according to the invention;

DESCRIPTION OF A PARTICULAR EMBODIMENT OF THE METHOD ACCORDING TO THE INVENTION

Figure 2B:
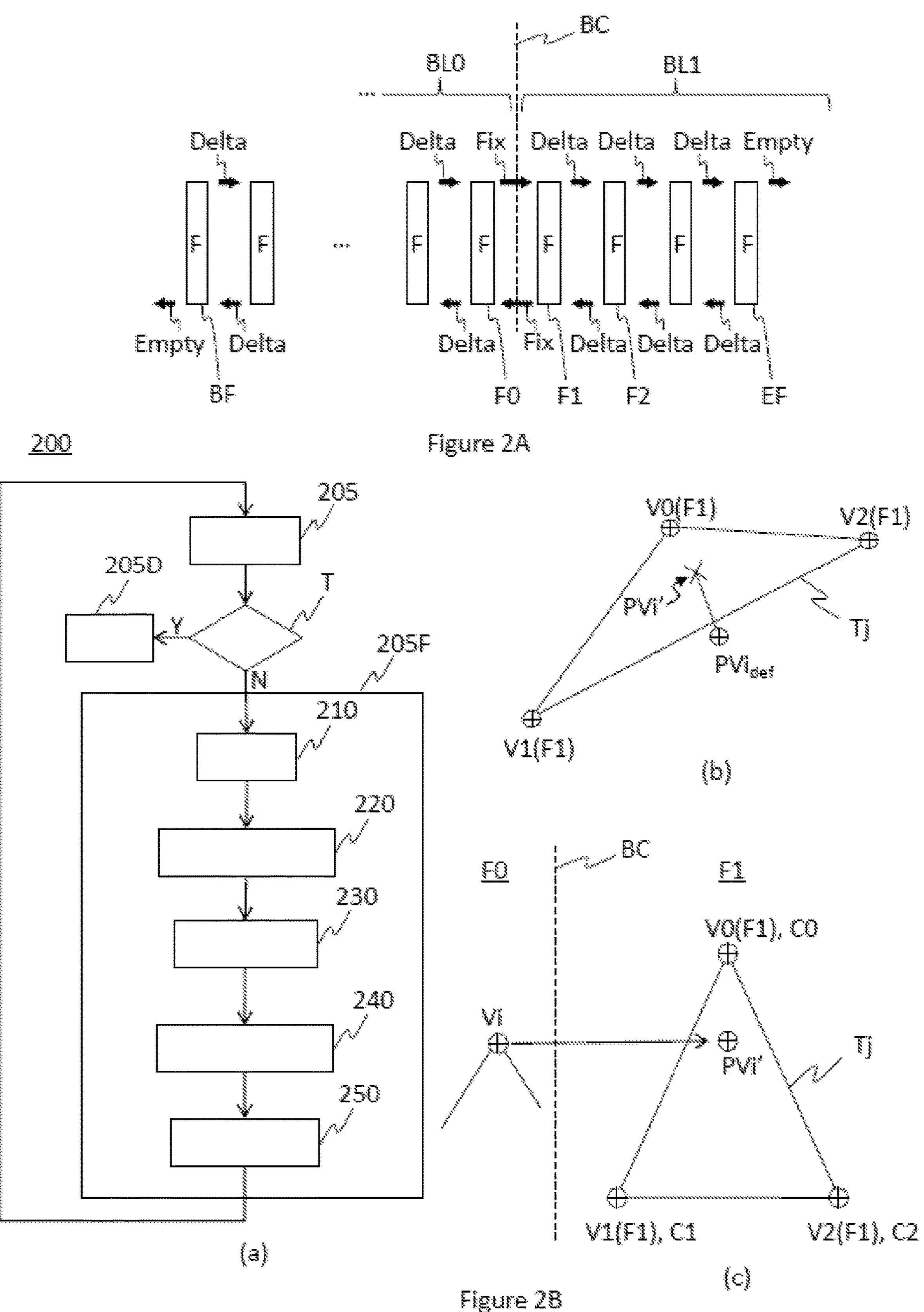
FIG. 2B shows a method for computing the bridges of FIG. 2A.

The volumetric data that are objects of the method according to the invention can be, for example, deduced from the capture by videogrammetry of a three-dimensional scene 125 as shown in FIG. 1A, that is to say by means of a set of cameras 130 spatially distributed and capturing images of the scene 125 played by actors 105 in a videogrammetry studio 100, generally at a frequency of the order of 30 to 60 images per second.

The cameras 130 are functionally connected to a data storage and processing system 140, as well as to a user interface 150 making it possible to control the cameras and the system, such as a computer equipped with one or more hard disks.

Said images are used to recreate the action of the scene by calculating a point cloud for each instant of capture.

Each point cloud is then modeled by means of a mesh M of facets that are continuously connected to each other and defined by particular points that are their vertices.

These facets are often triangles, as shown in FIG. 1B, which represents a mesh M modelling a human head.

In the following, this embodiment will be shown in means of a mesh consisting of triangles, but other types of facets could be used.

The mesh is representing the surfaces, seen by the cameras, of the elements of the scene.

Each triangle is identified by means of the three vertices V defining it, respectively V0, V1 and V2 in the form of a triplet {V0, V1, V2}, the position of each vertex being known in a three-dimensional reference frame associated with the scene.

Each instant of capture of the scene corresponds to a frame associated with a volumetric data set consisting of the mesh associated with this frame.

Before processing, the number of triangles used and their connectivity are generally different from one frame to the next.

Conventionally, in order to limit the volume of the data to be processed, a geometric tracking of the mesh is carried out over time, consisting in approximating the meshes of certain frames by deformation of a reference mesh belonging to a reference frame called "keyframe", such that the meshes of the following frames consist of the same triangles of the same connectivity as this reference mesh, these frames constituting a block of frames.

The meshes of the same block of frames therefore have, by construction, the same topology, that is to say they consist of the same triangles having the same connectivities.

When it is not possible to approximate a mesh acceptably by deforming the mesh of the reference frame, a new reference frame is defined with a new reference mesh, and the operation is repeated until the meshes of all the frames are processed, thus defining all the blocks of frames.

The meshes of two consecutive blocks of frames, and in practice two distinct blocks, have given different topologies by construction, that is to say they consist of different triangles having different connectivities.

The frames whose mesh is defined as described hereinabove on the basis of the mesh of a keyframe, and which are therefore situated between two consecutive keyframes, are said to be "interframes".

FIG. 1C shows a set of blocks FB of frames F wherein each block of frames consists of a single key frame KF and of interframes IF.

The document "High-quality streamable free-viewpoint video", *ACM Trans. Graphics* (SIGGRAPH), 34(4), 2015, gives an overview of the well-known method described above.

We see that the volumetric data do not correspond to pixels as in the case of 2D Videos, but are defined by a mesh consisting of surfaces, themselves defined by triangles whose vertices have a known positioning in a system of coordinates.

The present embodiment is based on the use of so-called "bridge" elements, which define, for each vertex of the mesh of a first frame called "source frame", an approximate position on a surface of the mesh of a second frame called "target frame", this approximate position being expressed in a reference frame specific to the mesh of the target frame.

These bridges make it possible to perform a time tracking of points defining the mesh and to apply filters to 3D video sequences.

A reference frame specific to a given mesh is defined by the identification of the vertices of the constituent and their respective connectivity to one another.

A direct consequence of this definition is that a reference frame specific to a mesh makes it possible to easily connect any point of the surface of this mesh to the coordinates of its vertices. In particular, it can easily be ensured that a position point defined by this specific reference frame is located on a facet of the mesh.

An example of using such a reference frame consists in defining the position of a point of the mesh by the facet on which this point is located and by barycentric coordinates associated with the vertices defining this facet, these barycentric coordinates defining the position of the point on the facet.

The use of a reference frame specific to each mesh as described in the invention allows for a tracking of positions defined by means of these meshes in a video sequence, simply and with efficient use of computing resources.

It should be noted that a Euclidean reference frame (defining positions by three coordinates along three axes defining a three-dimensional space) is not considered as a reference frame specific to the meshes of the frames of a video sequence: the points defining the Euclidean reference frame are not defined by the meshes of the frames, the Euclidean reference frame being the same for all the frames and therefore unable to track positions defined by the meshes during the frames in an efficient use of computing resources.

In a complete 3D video sequence, with a first frame, a last frame, and intermediate frames comprised between these two frames, three types of bridges are defined: the Empty bridges, the Delta bridges and the Fix bridges, as shown in FIG. 2A.

FIG. 2A shows a complete sequence of frames F beginning with a beginning frame BF and ending with an end frame EF, the frames being grouped into at least one block BL0 and a block BL1 as defined above, the block BL1 immediately following the block BL0 in the direction of the video sequence, the change from $BL_0$ to $BL_1$ is visualized by a block change line BC.

In the direction of the video stream (from BL0 to BL1), the last frame of the block BL0 is the frame F0, the first frame of the block BL1 is the frame F1 and the second frame of the block BL1, which immediately follows the frame F1, is the frame F2.

Empty Bridges

The first and last frames of the sequence, respectively BF and EF, do not have a left and right frame, respectively, that is to say towards the outside of the sequence, as shown in FIG. 2A.

In these particular cases, we define so-called Empty bridges, indicating arbitrarily the absence of correspondence of a vertex due to the absence of a frame, which are identified by "Empty" in FIG. 2A.

General Cases

For the other cases of figures, the preliminary method 200 is implemented for defining a list of associations between original positions of the vertices of the mesh of a source frame and respective associated positions expressed in a reference frame specific to a mesh of a target frame, as shown in (a) of FIG. 2B, and starting by a step 205 of designating a source frame and a target frame, followed by a test step T determining whether the source frame and the target frame belong to a same frame block (Y) or to two distinct frame blocks (N).

If the two frames belong to a same frame block, the bridge associated with these two frames will be a Delta bridge determined by a step 205D, whereas if the source frame and the target frame belong to two different blocks (N), therefore associated with two different mesh topologies and two different specific reference frames, the bridge associated with these two frames will be a Fix bridge determined in a step 205F.

Delta Bridges

Within a given block, like the block BL1 of FIG. 2A, the meshes of each frame have the same topology, that is to say they are formed of the same triangles.

Thus, the tracking of the vertex from one frame to another is extremely simple, since it is sufficient to indicate, by means of the Delta bridges identified by "Delta" in FIG. 2A, that the vertices of a target frame have the same identifiers as the corresponding vertices of the source frame.

This operation corresponds to the expression of the identity between a given vertex of a frame and the same vertex in an immediately adjacent frame, like between the frames F1 and F2 in the example shown in FIG. 2A, and this for each of the vertices of the frames.

Thus, a bridge $BR_{12}$ tracking the vertices of the frame F1 in the frame F2 and a bridge $BR_{21}$ tracking the vertices of the frame F2 in the frame F1 can each be written {Id} where Id identifies an identity operator indicating that the identifier of each of the vertices is identical for the two frames F1 and F2.

Fix Bridges

The most complex case is the one where the mesh of the source frame and that of the target frame have different topologies, that is to say they comprise triangles in different numbers, the connections of which are also different.

This Situation corresponds to the change from one block to the other like the change from the frame F0 to the frame F1 of FIG. 2A.

The tracking of a position between these two frames will be ensured by means of the Fix bridges, identified by "Fix"

in FIG. 2A and calculated according to steps 210 to 250 of the method 200, which can be considered as sub-steps of step 205F.

Indeed, the Fix bridges will thus define an association making it possible to change from a defined position in the reference frame specific to the mesh of a source frame to a corresponding position in the reference frame specific to the target frame, thus enabling the tracking of a point of the scene in time even in the event of a change of topology in the meshes representing the scene.

In step 210, a current vertex Vi of the frame F0 is designated as a source frame and the frame F1 is designated as target frame, these frames being illustrated respectively by silhouettes (a) and (e) of FIG. 1D defined by respective meshes, (c) showing the superposition of these meshes.

It is sought to express, in a reference frame specific to the target frame F1, the position PVi' that the vertex Vi of the mesh of the source frame F0 would have if it is deformed so as to follow the overall movement of the scene shown, corresponding for example to the movement of a figure of the scene and/or to his movements.

In step 220, the mesh of the source frame is deformed so as to approximate the mesh of the target frame by tending to make the deformed mesh of the frame F0 superimposed on the mesh of the frame F1.

FIG. 1D shows in (b) the mesh of the source frame (a) deformed to approximate that of the mesh of the target frame (e).

Additionally, FIG. 1D shows in (d) the superposition of the mesh of (a) deformed with the mesh of (b).

The deformation of the mesh retains its topology, that is to say the number of triangles constituting the mesh and their connectivities, but modifies the position in space of the vertices of these triangles.

This step could be carried out manually, but it is preferably carried out by applying a conventional matching algorithm such as an ARAP (As Rigid As Possible) method, an ASAP (As Similar As Possible), an LABF (Linear Angle Based Flattening) method, an IC (Inverse Curvature) method, or a CP method (Curvature Prescription), as described in the document “A local/global approach to mesh parameterization” by Liu et al., Eurographics Symposium on Geometry Processing 2008, Volume 27 (2008), Number 5.

At the end of step 220, two meshes are spatially very close to one another but with different topologies and vertices.

We consider the vertex Vi of the mesh of the frame F0 and a position $PVi_{def}$ of the deformed mesh, corresponding to the vertex Vi having been moved by the deformation of the mesh of the frame F0 to approximate the mesh of the frame F1.

The $Vi_{def}$ position is generally not located on a facet of the mesh of the frame F1.

In step 230, for the position $PVi_{def}$ the closest position PVi' on a facet of the mesh of the target frame, is calculated by means of conventional calculation methods.

In step 240, the facet on which the position PVi', here the triangle Tj, is located, is identified by conventional methods, as shown in (b) in FIG. 2B.

The triangle Tj is defined by three vertices of the mesh of the frame F1: V0(F1), V1(F1) and V2(F1).

In step 250, barycentric coordinates C0, C1 and C2 expressing the position PVi' in the triangle Tj are calculated in a conventional manner, these coordinates being associated respectively with the vertices V0(F1), V1(F1) and V2(F1).

In doing so, a position PV' is associated with the vertex Vi of the source frame F0 and this position is expressed in a reference frame specific to the target frame F1, this position PVi' reflecting the movement in time of the volumes defined by the meshes of the frames F0 and F1.

By applying steps 210 to 250 for each of the vertices of the mesh of the source frame F0, a bridge $BR_{01}$ is defined gathering all the respective associations of the vertices V of the mesh of the source frame F0 to triangles T of the mesh of the target frame F1 as well as to barycentric coordinates C0, C1 and C2 locating a position in these triangles, this bridge representing the evolution over time of the frame F0 to the frame F1, of positions of the vertices V.

Each of the associations listed in bridge $BR_{01}$ can be expressed by {T, C0, C1, C2}, the bridge for example taking the form of a table gathering each of these associations.

If normalized barycentric coordinates are used, the sum of which is 1, the expression of the bridge $BR_{01}$ can be simplified in {Tj, C0, C1}, C2 being deduced from C0 and C1.

Further, in order to perform tracking in both directions of time, it is necessary not only to calculate the bridge $BR_{01}$, but also the bridge $BR_{10}$ by assigning this time the frame F1 as a source frame and the frame F0 as the target frame.

It is possible to optimize the calculation of the bridge $BR_{10}$ by using the deformation of the source frame F0 towards the target frame F1 previously calculated during the step of calculating the bridge $BR_{01}$ and defining for each of the vertices of the mesh of the frame F1 the closest position PVi' on a facet of the mesh of the frame F0.

However, in the inventors’ experience, the results are then less satisfactory than passing through the deformation of the source frame F1 to the target frame F0 and repeating all the calculation mode discussed above to obtain the bridge $BR_{01}$.

By defining Delta, Empty or Fix bridges, for each frame as detailed above, an association is established between the positions of each vertex of each frame and of the positions in the neighboring frames, these associations representing the evolution in space of the elements of the scene over time.

Based on these associations, it is possible to track a point of an element of the scene simply and very efficiently it terms of computing resources over an entire 3D video sequence.

Direct Applications of Bridges (VTransfer and PTransfer Functions, Combining bridges)

The bridges as defined above for each frame of a 3D video sequence make it possible to track a position of any point on a surface of the mesh of a first frame called the source frame in front or behind in the sequence, so as to track the movements of the element or elements modeled by the meshes.

We are talking about associating a position of the source frame with a position of the target frame.

VTransfer

A simple application of the bridges consists in associating a vertex of interest Vint of a source frame at a position PVint' with the surface of the mesh of a target frame.

It is possible to express the PVint' position by PVint'=VTransfer (Vint, BR) where VTransfer is a function associating a position on the surface of the mesh of the target frame at the vertex Vint of the source frame, by using a bridge BR as defined above.

If the two frames belong to one and the same block, then VTransfer defines by means of a Delta bridge the position PVint' as that of the top of the target frame with the same identifier as Vint.

Figures 3A, 3B:
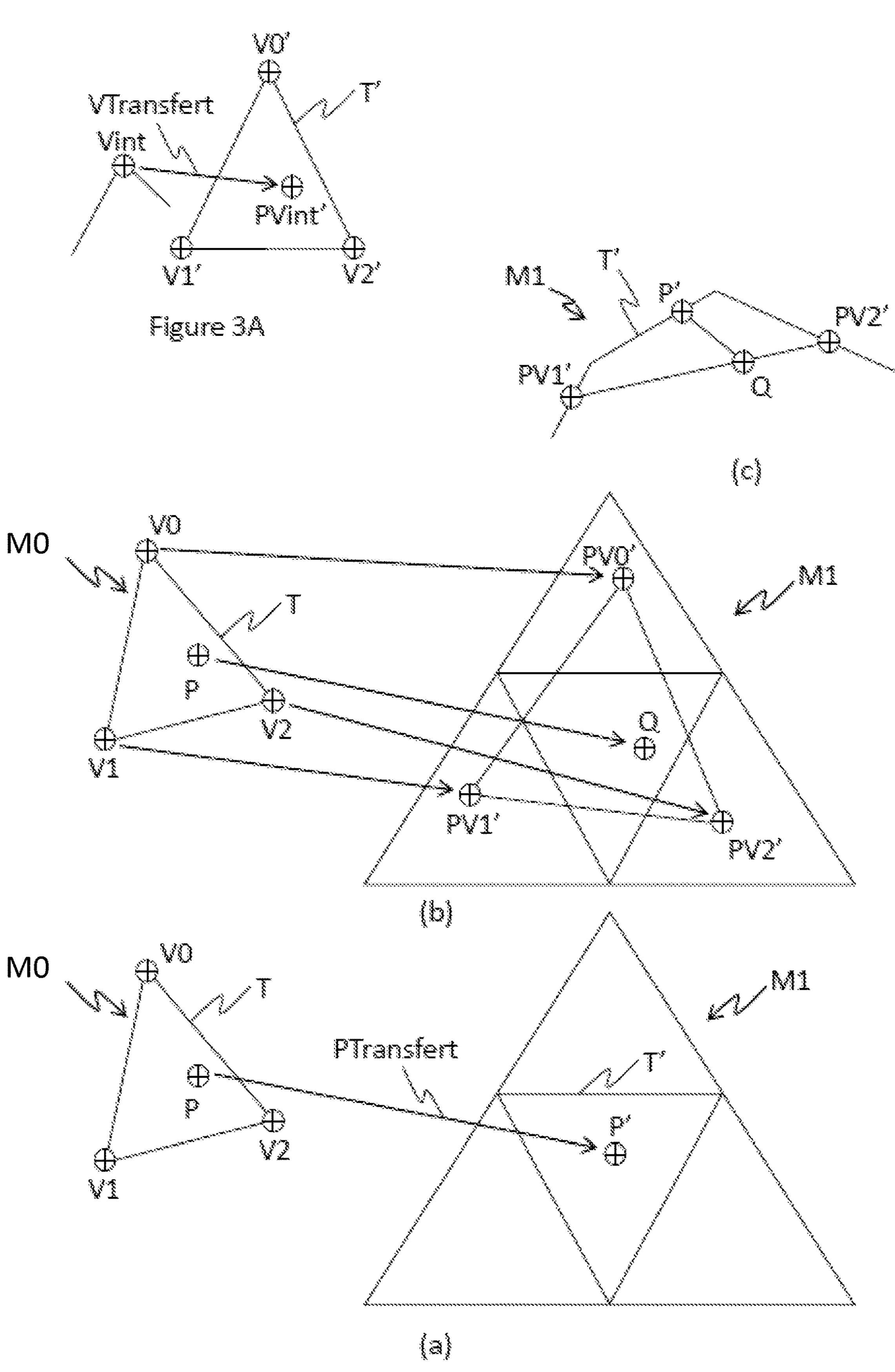
FIG. 3A shows a simple application of the bridges of FIG. 2A.
FIG. 3B shows a general application of the bridges of FIG. 2A.

If the two frames belong to two distinct blocks, then VTransfer defines, by means of a Fix bridge, the position PVint' on the triangle T' of the mesh of the target frame by (V0'*C0+V1'*C1+V2'*C2), where V0', V1' and V2' correspond to the vertices of the triangle T' indicated by the Fix bridge for Vint and C0, C1 and C2 are the normalized barycentric coordinates indicated by this bridge, as shown in FIG. 3A.

In the above notation, Vj*Cj corresponds to the multiplication of each of the coordinates of the vertex Vj in the reference frame associated with the scene by the barycentric coefficient Cj, and results in each of the coordinates of the position Vint'.

The function VTransfer makes it possible to determine the position associated with a vertex following the transformation of the mesh of a source frame to a target frame, in practice two consecutive frames in a 3D video sequence.

PTransfer

A more general application of the bridges as defined by the VTransfer function is the association of a position P of interest, belonging to the surface defined by the mesh M0 of a source frame F0, at a position P' located on a triangle T' of the surface defined by the mesh M1 of a target frame F1, as shown in (a) of FIG. 3B.

Unlike VTransfer, Ptransfer does not require the position P to be that of a vertex of the mesh.

Figure 4A:
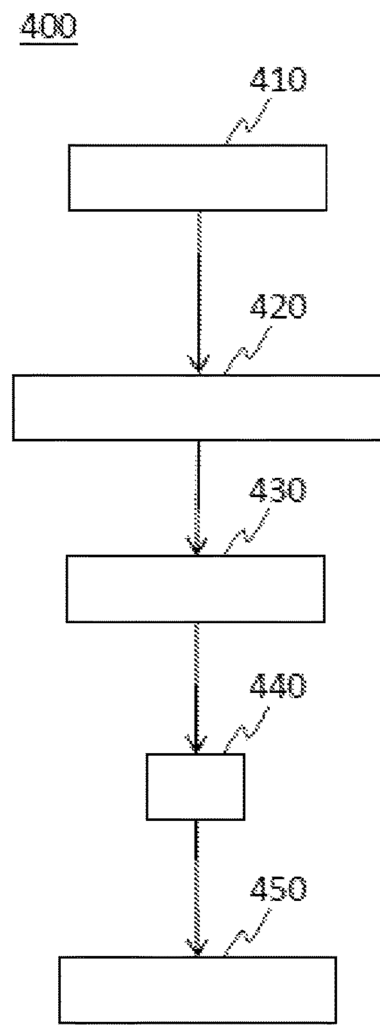
FIG. 4A shows a calculation method based on the use of the bridges of FIG. 2A.

By means of a method 400 shown in FIG. 3B and FIG. 4A, the position P' is expressed by P'=PTransfer (P $BR_{01}$) where PTransfer is a function associating a position on the surface of the mesh of the target frame at any position P of the mesh surface of the source frame, by applying the bridge $BR_{01}$ for tracking between the frames F0 and F1, as defined above.

In a step 410 of the method 400, the position P of interest is expressed in barycentric coordinates C0, C1 and C2 of the triangle T, containing it in the mesh of the source frame, this triangle being defined by its three vertices V0, V1 and V2.

In a step 420, the positions PV0', PV1' and PV2' of the target frame are calculated, respectively associated with the three vertices V0, V1 and V2 of the source frame by means of the VTransfer function defined above:

PV0'=VTransfer (V0, $BR_{01}$)

PV1'=VTransfer (V1, $BR_{01}$)

PV2'=VTransfer (V2, $BR_{01}$).

In a step 430, the barycentric coordinates of a position Q in the triangle are calculated whose vertices are located by the three positions PV0', PV1' and PV2' by applying to these three positions the barycentric coordinates C0, C1 and C2 of the position P, which defines the position Q corresponding to P in the target frame F1: PV0'*C0+PV1'*C1+PV2'*C2, as shown in (b) in FIG. 3B and with the same notation as used above.

The position Q is generally not located on the surface of the mesh M1 of the target frame F1.

In a step 440, and similarly to step 230 of the method 200, the position which is closest to Q on the surface of the mesh of the target frame F1 and which is the desired position P', as shown in (c) of FIG. 3B, is determined with a view from a point located in the plane defined by the positions PV1', PV2' and PV3'.

In a step 450, and similarly to step 240 of the method 200, barycentric coordinates C0', C1' and C2' are calculated, expressing the position P' in the triangle T' of the frame M1 on which it is situated.

In doing so, the position P' associated with the position P of the source frame F0 is expressed in a reference frame specific to the target frame F1, this position taking into account the displacement over time of the entirety of a volume defined by the meshes.

The application of the PTransfer function can be repeated frame by frame, enabling the tracking of the position of a point or of an element of the scene in an entire 3D video sequence.

Combining Bridges

In a given 3D video sequence, it is possible to perform a tracking on two immediately consecutive frames Fp and Fq as described in detail above, but also between two non-consecutive frames, such as Fp and Fr, the frame Fq being interposed between these two frames.

If there are bridges Bpq and Bqr, respectively clarifying the tracking between the frames Fp and Fq and between the frames Fq and Fr, it is possible to implement a combination between these bridges according to the rules set out below in order to obtain the bridge Bpr allowing the tracking between the non-consecutive frames Fp and Fr.

An Empty bridge combined with any Delta or Fix bridge, gives an Empty bridge.

A Delta bridge combined with a Delta bridge gives a Delta bridge.

A Delta bridge combined with a Fix bridge gives this same Fix bridge.

The three above-mentioned combination rules are commutative in the algebraic sense, that is to say that a combination of a bridge Ba with a bridge Bb in this order is strictly equivalent to the combination of bridge Bb with bridge Ba in that order.

The combination in this order of the bridges BRpq and BRqr as defined above in the case where the two bridges are Fix bridges, i.e. BRpq*BRqr, gives a bridge Bpr as calculated below, this rule not being commutative.

It is sought to express, in a reference frame specific to the target frame Fr, the position that a vertex V of the mesh of the source frame Fp would have if it were moved so as to follow the overall movement of the scene represented by the mesh cells of the frames.

Figure 4B:
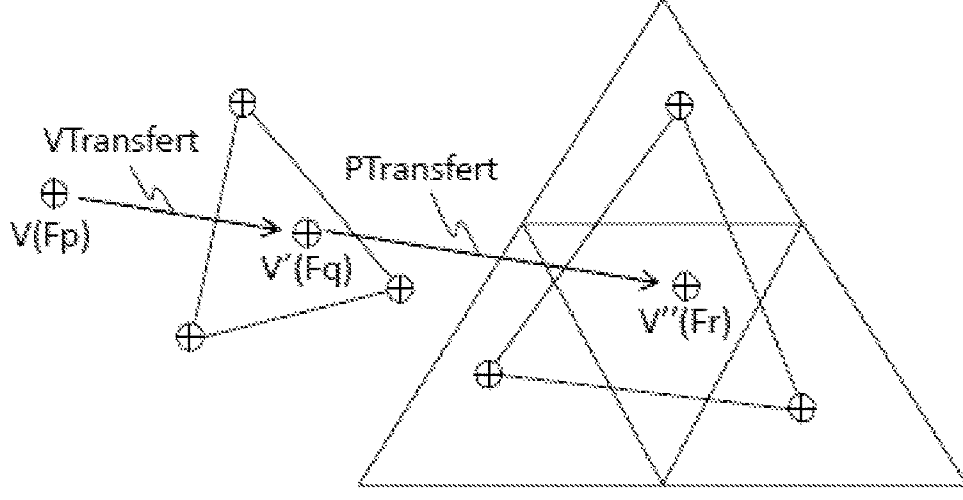
FIG. 4B shows a method of creating a bridge.

To this end, the function VTransfer (V, BRpq) described above is applied to this vertex V of the mesh of the frame Fp, to obtain a position V' on the surface of the mesh of the frame Fq, then the function PTransfer (V', BRqr) described above is applied to this position V' to obtain a position V" on the surface, as shown in FIG. 4B.

Repeating this operation at each vertex of the mesh of the frame Fp makes it possible to constitute the bridge BRpr as part of the bridges BRpq and BRqr.

An application of the combination of the bridges is the change of a sequence of 60 frames per second to 30 frames per second (or fps), an operation wherein every other frame is removed.

In this case, calculating a new set of bridges for the sequence at 30 fps is easily done from the bridges already calculated for the 60 fps sequence: from the two calculated bridges for tracking over three consecutive frames (BRpq and BRqr), a single bridge (BRpr) is calculated for tracking between the first and the third frame, the frame in the middle being removed, following exactly the combination procedure explained above.

Because the bridge combination operator described above gives as a result a new Bridge and since this operator is associative, it is possible to optimize the tracking of one or several points throughout the sequence thanks to known approaches based on pre-calculations such as, for example, parallel summation or another similar approach.

It is also understood that, once the necessary bridges have been calculated, and by following an optimization approach such as the one cited above, it is possible to track a point in real time, most of the necessary calculations having already been carried out.

Specific Applications

Generally, any application requiring the tracking of the position of a point on the surface of a mesh in a 3D video sequence can benefit from the bridges and functions detailed above.

This is for example the case of any graphic processing of a frame of a sequence that is intended to be applied to other frames of this sequence.

A first example of a tracking application is that of audio tracking, wherein it is sought to associate a 3D position of an audio source in a 3D video scene over time, as in the case of an actor speaking while moving in the scene.

In the context of a virtual reality application, it is important that this audio source be placed in the space coherently and follow the movement of the actor.

In this example, an operator chooses a frame and defines therein the position of the audio source manually at the mouth of the actor, and then the tracking of this position over time is carried out automatically by applying the PTransfer function recursively from frame to frame from this manually defined position.

More specifically, the data representing the 3D video scene (or three-dimensional volumetric scene), comprising a sequence of consecutive frames each associated with a respective mesh representing the scene at a given instant, are stored in the data storage and processing system 140.

Figure 5:
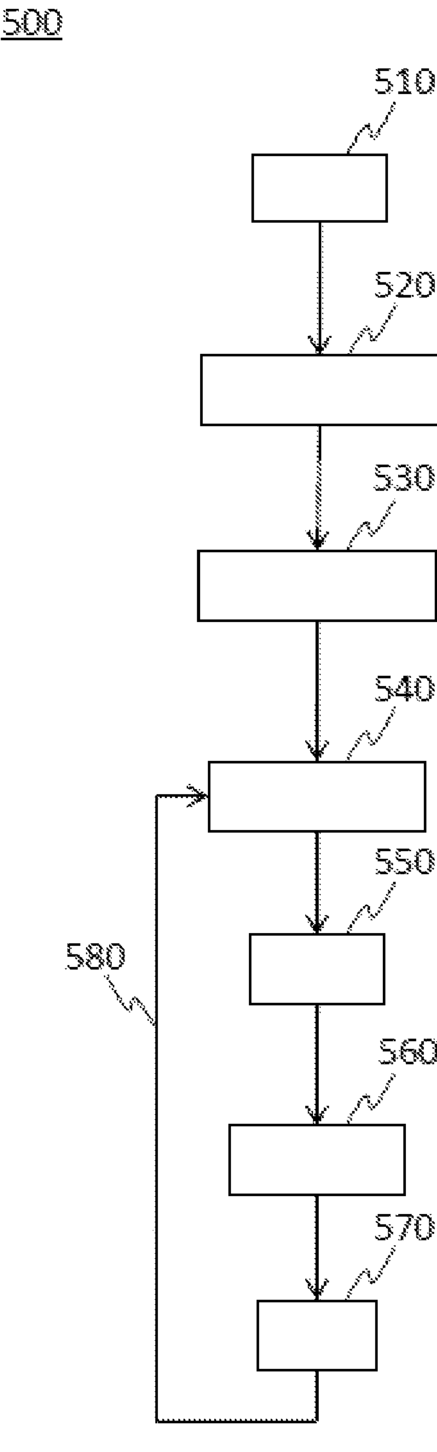
FIG. 5 shows an application for tracking a point in consecutive frames.

The tracking method, shown in the diagram 500 of FIG. 5, is implemented by the data storage and processing system 140 and comprises a step 510 of accessing the data in the data storage system (140) and a step 520 of designating by a human operator, in the sequence of consecutive frames, a first frame associated with a first mesh.

In this first frame, the human operator designates, in the first mesh and during a step 530 of designating, a first position corresponding to the mouth of an actor of the scene.

In a step 540, the system 140 then determined a first facet of the first mesh on which the first position is located, by conventional calculation means carried out by the data storage and processing system 140 which will also perform the calculations of the subsequent operations.

The first position can be expressed in barycentric coordinates in the reference frame formed by the vertices of the first facet.

Prior to the starting of the tracking method, a list of associations is defined between the positions of each vertex of each frame and of the positions in the neighboring frames, these associations representing the evolution in space of the elements of the scene over time, these associations being able to be formed by the bridges defined above and being stored in the data storage and processing system 140.

In a step 550, this list of pre-established associations is accessed which indicate in particular associations between the positions of the vertices of the first facet and respective associated positions expressed in a reference frame specific to a second mesh of a second frame of the sequence.

From the respective associated positions, in a step 560 a position is determined that is located in the second mesh, which is associated with the position designated in the first mesh, and which can be expressed by barycentric coordinates of the facet of the second mesh to which it belongs.

In the particular case of audio tracking, the sound source is further associated with the position in the second mesh associated with the position of the first mesh in a step 570.

The two steps 550 and 560 may for example be implemented by means of the Ptransfer function defined above.

By repeating steps 540 to 570 frame by frame, starting for each iteration from the position determined in step 560 of the previous iteration instead of the first position, a step 580 of automatically tracking the position defined manually by the human operator and associating it with a 3D position of an audio source can be carried out.

Note that the first frame can be chosen arbitrarily at the beginning, during or at the end of the video sequence, the second frame being able to be located in the time before or after the first frame, the pre-established associations making it possible to associate positions independently of the order of the frames considered.

Furthermore, the first frame and the second frame may be consecutive or non-consecutive, that is to say separated by one or more other frames, the associations between the positions of each vertex of each frame and of the positions in the neighboring frames making it possible to establish associations between non-consecutive frames, for example by combinations of bridges as explained above.

A second example of application is a geometric antivibration filter wherein the positions of a point of a scene are followed in a given sequence as detailed above, then compared, the meshes of the frames being adjusted around averaged positions so as to eliminate or reduce vibrations from this point.

Unlike the first example, the step 530 of designating a point in the image is automated, supported by the data storage and processing system 140 which can, for example, be configured so as to successively designate the set of vertices of a mesh of a given frame.

Of course, the applications of the embodiment disclosed in this document are not limited to the examples cited above, and the person skilled in the art will immediately understand that any processing of a 3D video sequence involving the tracking of a point of a scene in space and over time can benefit from the present invention.

Although for reasons of conciseness in the explanations of the method according to the invention, the examples used process a sequence of consecutive frames, such as the frames F0, F1 and F2, the invention is not limited to consecutive frames, in particular during the definition of bridges, but extends to the definition of bridges between two separate frames of one or more other frames in a video sequence.

It goes without saying that the present invention is not restricted to the embodiment disclosed above, and may be modified without departing from the scope of the invention.

The invention claimed is:

1. A method for digitally processing data representing a three-dimensional volumetric scene and derived from a videogrammetry capture of a three-dimensional scene and comprising a 3D video sequence with frames each associated with a respective mesh consisting of facets and representing volumetric data of the three-dimensional volumetric scene at a given instant, the method being implemented by computer and comprising the steps of:

accessing, in a data storage and processing system, said data representing a three-dimensional volumetric scene;

designating, in the sequence of frames, a first frame associated with a first mesh of said respective meshes; and designating a first position in the first mesh, the method being characterized in that it further comprises the steps of:

determining a first facet of the first mesh on which the first position is located;

accessing, in the system, a list of pre-established associations between original positions of vertices of the first facet and respective associated positions expressed in a reference frame specific to a second mesh of a second frame of the sequence of frames, these associations representing an evolution of the scene over time, the first mesh and the second mesh having different topologies; and determining, from the respective associated positions, a position located in the second mesh associated with the designated first position in the first mesh;

wherein each of the respective associated positions is defined by an affiliated facet of the second mesh on which it is located and barycentric coordinates associated with this affiliated facet.

2. The method according to claim 1, wherein the first frame and the second frame are two consecutive frames.

3. The method according claim 1, further comprising a step of associating a position of a sound source at the position located in the second mesh.

4. The method according to claim 1, wherein the frames belong to at least two blocks of frames having different topologies, the list comprises pre-established associations between positions of each vertex of each frame and positions in neighboring frames, these associations representing the evolution in space of elements of the scene over time, and when two frames considered belong to a same block of frames, then the pre-established associations are defined by an identity operator.

5. The method according to claim 1, further comprising a preliminary step of generating the list of pre-established associations between the original positions of the vertices of the first facet and the respective associated positions expressed in the reference frame specific to a second mesh, comprising the steps of:

designating a current vertex of the first mesh;

deforming the first mesh so as to approximate the second mesh;

calculating, for a position of the first deformed mesh corresponding to the current vertex, an approximate position that is closest to a facet of the second mesh;

identifying the facet on which the approximate position is located; and calculating barycentric coordinates defining the approximate position in the reference frame specific to the second mesh.

6. A data processing system comprising means for implementing the steps of the method according to claim 1.

7. A computer program comprising instructions stored on a non-transitory data storage, when the program is executed by a computer, allow the latter to implement the steps of the method according to claim 1.

8. A non-transitory computer-readable medium comprising instructions which, when executed by a computer, allow the latter to implement the steps of the method according to claim 1.

* * * * *